Patented Oct. 14, 1924.

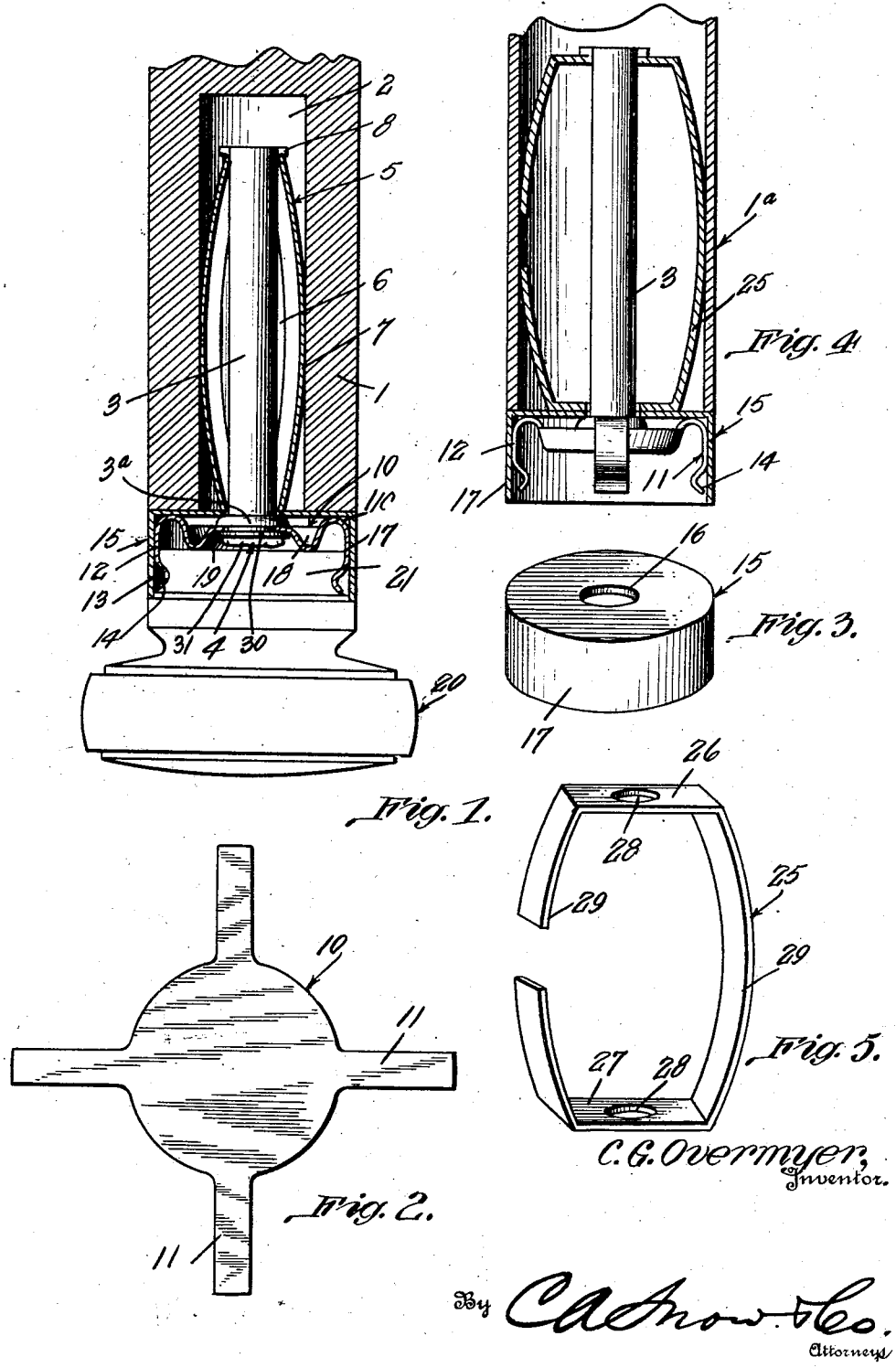

1,511,906

UNITED STATES PATENT OFFICE.

CHARLES G. OVERMYER, OF HARTFORD CITY, INDIANA.

GLASS CASTER.

Application filed November 3, 1923. Serial No. 672,663.

*To all whom it may concern:*

Be it known that I, CHARLES G. OVER-MYER, a citizen of the United States, residing at Hartford City, in the county of Blackford and State of Indiana, have invented a new and useful Glass Caster, of which the following is a specification.

This invention relates to casters for furniture and more particularly to gliding casters and attachments therefor.

The object of this invention is to provide a caster of this character so constructed that with slight difference in the arrangement the same casters may be used on all wooden furniture and metal beds.

Another object is to provide means for attaching glass casters to furniture so constructed as to practically eliminate all breakage of the glass, and the parts of which are made removable so that any part being damaged or broken may be readily replaced.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a vertical section of a wooden furniture leg with this improved caster shown applied;

Fig. 2 is a plan view of the blank from which the attaching plate is constructed;

Fig. 3 is a detail perspective view of the holding cap constituting a part of the attaching device;

Fig. 4 is a section of a metal bed leg showing the caster attaching device modified for use in connection therewith; and Fig. 5 is a detail perspective view of the connector for uniting the attachment to the bed leg.

In the embodiment shown in Figs. 1 to 3 a wooden leg 1 is shown having an upwardly extending socket 2 opening through its lower end in which the pin or connecting shank 3 of the caster is located. This pin 3 has a head 4 which is designed to be housed under an attaching plate 10 presently to be described by means of which it is held out of contact with both the caster 20 and the leg.

A cylindrical retaining element 5 encircles pin 3 and has cut out portions or slots 6 formed therein to render it resilient forming slats 7 which are bowed out intermediate their ends the end of the cylinder located within the socket 2 being designed to snap under lateral projections 8 on the inner end of pin 3 while the other end of said cylinder rests on a locking washer or cap 15. This washer has a central aperture 16 for the passage therethrough of the pin 3 and is provided with an annular flange on its periphery which is designed to fit over the attaching plate 10 to hold it engaged with the caster as shown in Fig. 1.

The plate 10 is made of resilient sheet metal struck out in the form shown in Fig. 2 with radially extending fingers 11 designed to be bent at right angles for a portion of their length as shown at 12 in Fig. 1 and then bent inwardly at an oblique angle as shown at 13 and then outwardly to form inclined caster engaging terminals 14, the portions 13 of said fingers fitting under a shoulder 21 on the inner end of the caster 20 when the device is applied.

The plate 10 has an annular corrugation 18 formed therein and a central seat 19 of less depth than said corrugation 18 to provide a space thereunder for the head of pin 3 whereby said head is held out of contact with said caster. This seated portion of the plate 10 is centrally apertured for the passage of pin 3 (see Fig. 1). A collar 3ª on pin 3 is spaced from the terminal thereof and rests on the upper face of plate 10. A washer 30 is mounted on pin 3 below plate 10 and the end of the pin upset as shown at 31 whereby plate 10 is clamped between collar 3ª and washer 30 and the pin with the plate.

In assembling the device the upper end of pin 3 is passed through the central opening in cap 15 and its lower end passed through plate 10 and the washer 30 applied and secured. The gripping fingers 11 of the plate 10 are then engaged with the shouldered end of the caster 20 and are locked in engagement therewith by the cap 15 with the flange 17 of said cap snugly fitting around the fingers 11 and resting on a ledge 22 of caster 20 thus holding said fingers against spreading and preventing the consequent release of the caster.

The cylindrical member 5 is then placed on pin 3 with one end resting on cap 15 and the other engaged under the lugs or projections 8 of pin 3 whereby the caster is securely connected with the pin. The pin with the outwardly bowed cylinder thereon is then inserted in the socket 2 with the bowed portion of the cylinder frictionally engaging the side walls of the socket and the end of leg 1 contacting with the outer face of cap 15.

The above-described construction is designed for all furniture in which ordinary casters are used except for metal bed legs such as that shown in Fig. 4 at 1ª. With legs of this character the same casters and attachment may be used except cylinder 5 which is replaced by a connector 25 made from a metal strap bent as shown in Fig. 5 the top and bottom parallel members 26 and 27 of which are apertured as shown at 28 for the passage therethrough of the pin 3. The side members 29 are bowed outwardly for frictional engagement with the opposed walls of the inner portion of leg 1ª whereby the caster may be reliably connected with the leg.

It is of course understood that the caster is detachable by lifting the cap 15 which provides for the replacement of any parts which may become broken or damaged and the springing on and locking arrangement will eliminate breakage in the glass.

I claim:—

1. The combination with a caster having an annular shoulder at its upper end, a pin carried plate having fingers to engage said shoulder, said pin having means for detachably connecting it with a socket, and cap-like member to fit over said plate and lock said fingers engaged with the caster.

2. The combination with a caster having a shoulder at its upper end, of a plate having resilient gripping fingers to engage said shoulder, a pin carried by said plate adapted to enter a socket in the article to which the caster is to be applied, means on said pin to frictionally engage the walls of the socket, and a cap-like locking washer carried by the pin and adapted to fit around said fingers and hold them engaged with the caster.

3. An attaching device of the class described comprising an attaching plate having circumferentially disposed gripping fingers, a cap to fit over said plate and hug said fingers to hold them in locking position, and means for connecting said plate and cap to the leg of a piece of furniture.

4. An attaching device of the class described comprising a corrugated plate having caster gripping fingers, said plate having a recess, a pin having a head housed in said recess and extending through said plate, a cap-like washer mounted on said pin and snugly fitting over said fingers, and friction means carried by said pin to secure it within a socket.

In testimony that I claim the foregoing as my own, I have hereto affixed my signature in the presence of two witnesses.

CHARLES G. OVERMYER.

Witnesses:
CLYDE H. OVERMYER,
C. R. GOUGH.